United States Patent Office.

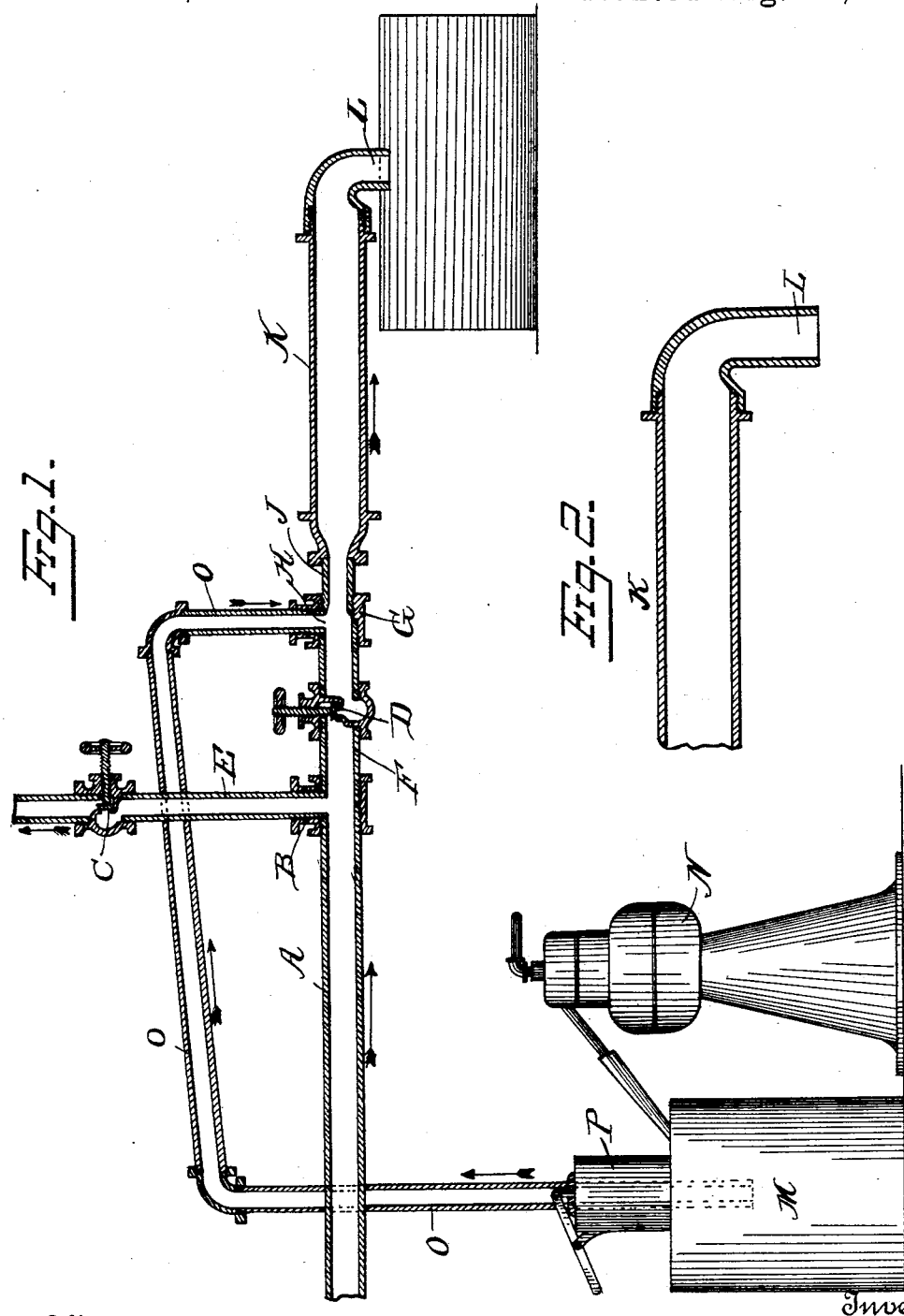

JENS CHRISTIAN NIELSEN, OF VIBORG, SOUTH DAKOTA.

LIQUID-STERILIZER.

SPECIFICATION forming part of Letters Patent No. 587,851, dated August 10, 1897.

Application filed October 19, 1896. Serial No. 609,352. (No model.)

*To all whom it may concern:*

Be it known that I, JENS CHRISTIAN NIELSEN, a citizen of the United States, residing at Viborg, in the county of Turner and State of South Dakota, have invented certain new and useful Improvements in Liquid-Sterilizers, of which the following is a specification, reference being had therein to the accompanying drawings.

The object of my invention is to provide a means for destroying the bacillariæ existing in milk, and particularly in skimmed milk, resulting from the action of a separator by means of the heat supplied from steam through the exhaust-pipe of a steam-engine; and I attain my object by the mechanical device hereinafter described and claimed.

In the drawings, Figure 1 is a side elevation of my device, partly in section. Fig. 2 is an enlarged view of the connection between the larger and smaller pipes.

Like characters of reference indicate the same parts.

The exhaust-pipe A, conveying exhaust-steam from an engine, is supplied with the coupling B, having an outlet through valves C and D in the pipes E and F, extending from the coupling B. The coupling G, attached to the valve D, is supplied with the opening H for the reception of the skimmed milk to be heated into the exhaust-pipe from the source of milk-supply, as from a separator. Between the coupling G and the sterilizing-chamber K is placed the reduced nozzle J, through which the steam and milk are forced into the sterilizing-chamber K, attached to the nozzle J. The sterilizing-chamber K discharges through the nozzle L into any suitable receptacle for the sterilized milk. The sterilizing-chamber is a pipe of larger diameter than the exhaust-pipe, so that the milk will travel slower therein than in a pipe of the same diameter as that of the exhaust-pipe, whereby the milk is retarded in the sterilizing-chamber to give time for the action of the exhaust-steam to perform its work of heating and sterilizing. The sterilizing-chamber should be adapted to that object in both its diameter and length.

The milk may be supplied from any convenient source; but for the purpose of this description I have shown the source of supply to be a tank M, into which skimmed milk has been discharged from a separator N. A supply-pipe O extends from the skimmed-milk tank to the coupling H in the exhaust-pipe located outwardly from the opening leading away from the sterilizing-chamber into which the supply-pipe O discharges. The force-pump P is a convenient means for delivering the milk through the supply-pipe O.

The valves C and D are provided for the purpose of regulating the amount of exhaust-steam let into the sterilizing-chamber K. By opening the valve C and closing the valve D the exhaust-steam will be sent through the pipe E instead of into the sterilizing-chamber K, whereby the heat in the sterilizing-chamber K may be reduced to a desired degree below what it would be if no means of cutting off the exhaust-steam were provided.

The operation of my device is as follows: The skimmed milk from the separator-tank M being forced upward through the pipe O and discharged into the exhaust-pipe A flows thence into the sterilizing-chamber K and is heated to a degree sufficient to destroy the bacillariæ therein and thus sterilizing the milk, thereby rendering it more healthful for food and particularly for very young calves and pigs, to which use skimmed milk from creameries is largely applied.

Having described my invention, I claim—

1. In a liquid-sterilizer, a sterilizing-chamber formed by an enlargement of the steam-pipe for the reception and retardation of the liquid to be heated by the action of steam in combination with a steam-pipe and a liquid-supply pipe connected with the steam-pipe, as and for the purposes set forth.

2. In a liquid-sterilizer, a sterilizing-chamber formed by an enlargement of the steam-pipe for the reception and retardation of the liquid to be heated by the action of steam in combination with a steam-pipe, a valve in the steam-pipe to control the admission of steam into the sterilizing-chamber and a liquid-supply pipe connected with the steam-pipe as and for the purposes set forth.

In testimony whereof I affix my signature in presence of two witnesses.

JENS CHRISTIAN NIELSEN.

Witnesses:
JAMES IBSEN,
JAMES M. RASMUSEN.